United States Patent [19]

Kuan

[11] 4,237,173

[45] Dec. 2, 1980

[54] WHITE SIDEWALL TIRE

[75] Inventor: Tiong H. Kuan, Stow, Ohio

[73] Assignee: The General Tire & Rubber Company, Akron, Ohio

[21] Appl. No.: 33,342

[22] Filed: Apr. 26, 1979

[51] Int. Cl.³ .............................................. B32B 3/00
[52] U.S. Cl. ................................... 428/65; 260/37 N; 428/423.1; 428/423.9
[58] Field of Search ............... 260/37 N; 428/65, 425, 428/423.1, 423.9

[56] References Cited

U.S. PATENT DOCUMENTS

| | | | |
|---|---|---|---|
| 3,278,459 | 10/1966 | Herold | 260/2 |
| 3,829,505 | 8/1974 | Herold | 260/611 |
| 3,941,849 | 3/1976 | Herold | 260/607 |
| 3,979,547 | 9/1976 | Roberts et al. | 428/423 |

*Primary Examiner*—Lewis T. Jacobs

[57] ABSTRACT

White tire sidewall made from a urethane derived from a hydrogenated diphenylmethane diisocyanate terminated apolytetrahydrofuran and pigmented with titanium dioxide has exceptionally good flex resistance and adhesion. High molecular weight triol and a low molecular weight diol are used to chain extend and crosslink the urethane.

1 Claim, No Drawings

WHITE SIDEWALL TIRE

The invention relates to a white sidewall tire.

Evaluation of tires in the run flat mode reveals that blackwall tires generally out-performed white sidewall tires of similar construction. Failure of the white sidewall tires occurred preferentially around the whitewall region. These observations suggest that the present method of fabricating a whitewall tire might have to be modified or the white sidewall compound be eliminated for improved mileage, especially in the run flat condition.

Painting a blackwall tire would be an attractive alternative for it permits one to retain the better performance of the blackwall tire without sacrificing the aesthetic look of a whitewall tire. In addition, painting could amount to a substantial reduction in the number of steps required to build a whitewall tire. U.S. Pat. No. 3,979,547, Roberts (1976) discloses a polyurethane-rubber based paint which can be used to paint rubber and not "orange peel".

A suitable paint should adhere effectively to the tire sidewall and be able to withstand the repeated flexing of the tire during service. None of the commercial paints evaluated to date can meet the above requirements satisfactorily.

A flexible coating which appears to have excellent flex resistance to "orange peel" plus ability to adhere to a nonstaining tire sidewall substrate is characterized by the presence of two essential ingredients. The first ingredient is (1) 100 parts of a prepolymer of a hydrogenated diphenylmethane diisocyanate terminated polytetrahydrofuran containing from 1 to 10% by weight of isocyanate groups; (2) a chain extending organic diol having a 2 to 6 carbon atom chain, and (3) a chain extending and cross-linking triol having a molecular weight of from 1,000 to 20,000 wherein the ratio of NCO groups of (1) to the total OH groups of (2) and (3) has a value of from 100:80 to 100:110 and preferably 100:90 to 100:95. Preferably the mole ratio of diol to triol has a value of about 30 to about 400.

The second ingredient is a titanium dioxide pigment from 4 to 10 parts of the pigment can be present. The pigment preferably has a particle size of from 0.1 to 0.5 microns.

Ingredients which can be used are old and well known and will not be described in detail here. Representative examples include:

| Ingredients | Example (mfr) | Description |
|---|---|---|
| Prepolymer | Adiprene LW510 (duPont) | Polytetrahydrofuran terminated by hydrogenated diphenylmethane diisocyanate and containing 4.25% NCO |
| Chain extending diol | 1,4 Butanediol | |

| Triols | | |
|---|---|---|
| Triols | Equivalent Weight | Manufacturer |
| Trimethylol propane | 44.7 | Mobay Chemicals |
| Pluracol TP740 | 241.0 | BASF Wyandotte |
| Thanol SF5500 | 1675.0 | Jefferson's Chemical |
| Thanol SF6500 | 2244.0 | Jefferson's Chemical |

Pigment

TITANOX ®
2015 pigment

TITANOX ® 2015 is a low oil absorption rutile pigment designed for coatings containing only titanium dioxide. Controlled particle size ensures high brightness, high tinting strength, blue tone in white and tints and ease of dispersion.

Physical Properties

| | |
|---|---|
| Crystal Structure | Rutile |
| Specific Gravity | 4.1 |
| One Pound Bulks | 0.0293 gallon |
| Oil Absorption, ± 10% | 19.5 |
| Retained on 325 Mesh | 0.01% maximum |
| Chalk Resistance | Moderate |
| pH | 7.0–8.0 |
| Composition | |
| $TiO_2$ | 95.0% minimum |
| Remainder | Principally alumina |
| Avg. Wear Particle size | 0.2μ |

Specifications
ASTM D 476-70, Type II
U.S.A.S. Z66.1 - 1964

A specific formula is disclosed in Table I below. Both the properties of the coating and that of a regular white sidewall rubber compound are shown for comparison.

TABLE I
Coating Formulation and Properties

| Materials | Description | Parts By Weight |
|---|---|---|
| Adiprene LW 510 | Hydrogenated diphenylmethane diisocyanate-terminated polytetrahydrofuran, 4.25% NCO; duPont Chemicals | 100.0 |
| A1163-96 | 65/35 ratio by weight of TITANOX ® 2015 (N&L Ind.) in dioctyl phthalate | 9.6 |
| Ionol | 2,6 di-t-butyl-4-methyl phenol, antioxidant; Harwick Chem. | 0.5 |
| T-12 | Dibutyltin dilaurate solution, catalyst, M&T Chemicals | 0.01 |
| 1,4 Butanediol | Chain extender | 4.13 |
| Thanol SF6500 | Trifunctional polyether polyol of molecular weight 6500; chain extender and cross-linker; Jefferson's Chemicals | 0.73 |

[1]Adiprene LW 510 is a polyether-based casting urethane polymer which is readily processable by conventional hand and machine mixing techniques. Adiprene LW 510 produces high quality elastomers in the 90A durometer hardness range when cured with MDA.

Product Description

| | |
|---|---|
| Physical Form | Viscous liquid |
| Color | Honey colored |
| Specific Gravity at 25° C./4° C. | 1.03 |
| Flash Point, °F. | Above 450° F. |
| Storage Stability | Excellent in absence of moisture |
| Viscosity, Brookfield cps at 212° F. | 1800–2000 |
| Available Isocyanate Content, % | 4.1–4.4 |
| Solubility | Soluble in aromatic hydrocarbons, ketones, esters and chlorinated hydrocarbons |

The diol and triol were mixed prior to addition to the polymerization mixture. Curing conditions: 250° F. (121° C.) for 30 minutes, followed by 122° F. (50° C.) for one week post cure.

| Properties | Coating Formulation | Commercial White Sidewall Rubber Compound |
|---|---|---|
| Shore A Hardness | 80 | — |
| 100% Modulus, MPa (ASTM D 412) | 1.66 | 0.34 |

-continued

| Properties | Coating Formulation | Commercial White Sidewall Rubber Compound |
|---|---|---|
| Tensile, MPa (ASTM D 412) | 28.95 | 11.6 |
| Elongation % (ASTM D 412) | 850 | 675 |
| Trouser tear, kN/m (ASTM D 470) | 18.5 | 3.4 |
| Flex Life Monsanto, flexes to failure (60% extension)[2] | 473,500 | 295,000 |
| DeMattia pierced (ASTM D 813) | $10^5$ flexes to 0.76 cm | $10^5$ flexes to 0.64 cm |

[2] Monsanto Fatigue or Flex Life Testing Dumbbell shaped tensile specimens are cyclically strained at a fixed frequency and a series of fixed maximum extension ratios such that little or no temperature rise is induced. As a result of flexing, cracks usually initiated by a flaw, ultimately grow and cause failure. The number of cycles to failure (fatigue life) recorded.

As shown, relative to the control, the flex life elongation of the coating and the tensile strength and the tear resistance is superior to the commercial white sidewall rubber compound. The in-situ formation of domains which are essential for reinforcing most polyurethanes available today, is apparently absent in the coating. The nature of the chain extenders used results in a soft coating which is essential for this application. The presence of hard domains would tend to make the coating overly stiff. The combination of a diol and a triol, when used with the proper stoichiometry, provides a network having the desired crosslink density for good tear and flex properties.

This particular method of chain extension plus using the proper type and level of pigmentation leads to the unexpected improvement in flex life. The properties of the coating formulation minus the pigment are shown in Table II below.

TABLE II

| Properties of Coating Formulation Without Pigment | |
|---|---|
| 10% Modulus, MPa | 1.48 |
| Tensile, MPa | 31.7 |
| Elongation, % | 725 |
| Trouser tear, kN/m | 8.62 |
| DeMattia, flexes to 0.5" | ~500 |

The remarkable difference in resistance to both tear and crack growth between a pigmented (Table I) and non-pigmented coating is demonstrated.

The adhesion of the pigmented coating to a non-staining sidewall compound, with and without surface modification, is also excellent. Adhesion ($\pi$-peel) test results are shown in Table III.

TABLE III

| | Adhesion of Coating to Sidewall ($\pi$-peel) | |
|---|---|---|
| Substrate Surface Treatment Technique | Average Peel Force/meter, kN | Peak Force, kN |
| Surface wiped with MEK | 4.17 | 0.205 |
| Chlorination (3 minutes) | 6.77 | 0.207 |
| Benzophenone activation followed by 5' exposure to UV | — | 0.203 |
| Chlorination (3 minutes) plus surface priming with Thixon's CB3/AB936-66 | 5.47 | 0.18 |

In all cases, peeling occurred by either fracturing the coating itself or the rubber substrate. The peak force shown represents the maximum force measured when the peeling test was stopped. It is actually the force required to deform the rubber until failure occurred without effecting peeling and is therefore related to the strength of the rubber. A comparison between the peak force and the average peel force provides an appreciation of the peel force involved. Treatment of the substrates surface prior to coating definitely improves adhesion but the level of adhesion achieved without any treatment may be adequate for the subject application. What causes the coating to adhere so well to the substrate even without treatment may be related partly to the reaction stoichiometry. The combined levels of the chain extenders used represents only 90% of the theoretically calculated stoichiometry (OH/NCO), hence, leaving an excess of 10% unreacted isocyanate. Some of these isocyanates would undergo further reaction within the urethane network to form intermolecular linkages either in the form of biuret or allophonate branch. Others may actually serve as adhesion promotor across the coating/substrate interface.

The solventless nature of the coating is another desirable feature for obvious reasons. Solvent(s) may be used, however, if the coating were to be applied by spraying or by other means where viscosity becomes important.

The following two Tables IV and V show the effect of the different molecular weight triols on the properties of the coating at OH/NCO ratios of 0.975 and 1.025, respectively. At the ratios of OH/NCO examined, there appears to be an increase in DeMattia flex life with increasing triol molecular weight. The DeMattia flex results represent the average of at least five specimens per sample. In the case when the variance is exceedingly large, the lower and upper values are reported. The poor flex life of sample below may be due to defects observed in the samples.

TABLE IV

| Effect of Triol Molecular Weight On Coating, OH/NCO = 0.975 | | | | | |
|---|---|---|---|---|---|
| | A | B | C | D | E |
| Materials | | | | | |
| Adiprene LW 510 | 100 | 100 | 100 | 100 | 100 |
| A1163-96 (65% TITANOX® 2015 in DOP) | 6.85 | 6.85 | 6.85 | 6.85 | 6.85 |
| Ionol | 0.5 | 0.5 | 0.5 | 0.5 | 0.5 |
| Dibutyltin dilaurate T-12 | 0.025 | 0.025 | 0.0125 | 0.01 | 0.025 |
| 1,4 Butanediol | 4.3 | 4.3 | 4.3 | 4.3 | 4.4 |
| Trimethylol propane | 0.22 | — | — | — | — |
| Pluracol TP740[3] | — | 1.2 | — | — | — |
| Thanol SF5503[4] | — | — | 8.3 | — | — |
| Thanol SF6500[4] | — | — | — | 11.1 | — |
| GT10650 Triol[5] | — | — | — | — | 7.0 |
| Properties | | | | | |
| Shore A | 81 | 80 | 79 | 79 | 80 |
| 10% modulus, MPa | 1.4 | 1.3 | 1.2 | 0.9 | 1.2 |
| 100% modulus, MPa | 4.3 | 4.1 | 3.9 | 3.9 | 3.8 |
| 300% modulus, MPa | 5.7 | 5.6 | 5.2 | 5.7 | 5.2 |
| Tensile, MPa | 12.4 | 19.5 | 19.7 | 18.2 | 13.5 |
| Elongation, % | 735 | 1010 | 1085 | 740 | 740 |
| Trouser, tear, kN/m | 14.0 | 14.4 | 13.5 | 13.1 | 15.1 |
| DeMattia, pierced flexes to 0.5" | <1000 | 2500 | 7500 | 1500 | 10,000–75,000 |

[3] The Pluracol TP740 trifunctional polyols were developed for use in flexible and rigid urethane foams, coatings and elastomers. Various members may be used in the preparation of prepolymers, as crosslinking agents or as polyol reactants in one-shot systems.

TP-740

Approximate weight per gallon, lbs.        8.5

TABLE IV-continued

Effect of Triol Molecular Weight On Coating, OH/NCO = 0.975

| | A | B | C | D | E |
|---|---|---|---|---|---|
| Viscosity at 77° F., cps. | | | | 300 | |
| Specific gravity 25/25° C. | | | | 1.02 | |
| Molecular weight | | | | 730 | |
| Hydroxyl number | | | | 232 | |
| pH, apparent | | | | 6.5 | |
| Water, % by weight, max. | | | | 0.10 | |
| Color, APHA, max. | | | | 40 | |

| | Acid number, mg. KOH/g., Max. | Color, Pt-CO scale, Max. | Flash-point COC, °F. | Hydroxyl number, mg. KOH/g. | pH, 10:6 iso-propanol water solvent | Potassium, ppm, Max. | Specific gravity 20/20° C. | Unsaturation, meq/g. Max. | Viscosity, cP, 75° F. | Water at shipment wt. %, Max. |
|---|---|---|---|---|---|---|---|---|---|---|
| Thanol SF5503 | 0.1 | 50 | 460 | 31–36 | 7.0–9.5 | — | 1.022 | 0.09 | 900 | 0.1 |
| Thanol SF6500 | 0.1 | 50 | 440 | 24–26 | 4.0–7.0 | 5 | 1.036 | 0.11 | 1220 | 0.1 |

[4]Thanol polyols
[5]A triol having a molecular weight of 10,650 produced by the methods disclosed in U.S. Pat. Nos. 3,278,459, Herold (1966); 3,829,505, Herold (1972) and 3,941,849 Herold (1974).

TABLE V

Effect of Triol Molecular Weight On Coating, OH/NCO = 1.025

| | A | B | C | D |
|---|---|---|---|---|
| Materials | | | | |
| Adiprene LW 410 | 100 | 100 | 100 | 100 |
| A1163-96 | 6.85 | 6.85 | 6.85 | 6.85 |
| Ionol | 0.5 | 0.5 | 0.5 | 0.5 |
| T-12 | 0.0125 | 0.0125 | 0.0125 | 0.003 |
| 1,4 Butanediol | 4.5 | 4.5 | 4.5 | 4.5 |
| Trimethylol propane | 0.24 | — | — | — |
| Pluracol TP740 | — | 1.23 | — | — |
| Thanol SF5503 | — | — | 8.7 | — |
| Thanol SF6500 | — | — | — | 11.7 |
| Properties | | | | |
| Shore A | 83 | 80 | 77 | 83 |
| 10% Modulus, MPa | 1.9 | 1.3 | 1.2 | 1.3 |
| 100% Modulus, MPa | 4.5 | 4.1 | 3.8 | 3.5 |
| 300% Modulus, MPa | 5.3 | 4.8 | 5.05 | 4.3 |
| Tensile, MPa | 15.2 | 12.3 | 16.8 | 6.8 |
| Elongation, % | 1115 | 1030 | 1050 | 640 |
| Trouser tear, kN/m | 16.5 | 16.3 | 14.4 | 11.7 |
| DeMattia, pierced flexes to 0.5" | 2,500–15,000 | 5000 | 5000 | 40,000–75,000 |

The coatings shown in the above two Tables have working life of only about five minutes. This is probably a bit short to be used for coating a tire manually. Reducing the amount of the catalyst from 0.0125 to 0.003 part extended the workable life to about 30 minutes. In order to accurately weigh the 0.003 part of catalyst, a 0.1% solution of dibutyltin dilaurate (T-12) in dioctyl phthalate was prepared. The presence of DOP, however, had an adverse effect on the tensile strength and tear property of the unaged coating, as shown in the Table below. After heat aging for one week at 50° C. (122° F.), significant improvements of the above properties, including the DeMattia flex life, were obtained.

TABLE VI

Effect of Catalyst Dilution and of Aging

| | A | B | C |
|---|---|---|---|
| Materials | | | |
| Adiprene LW 510 | 100 | 100 | 100 |
| A1163-96 | 6.85 | 6.85 | 6.85 |
| Ionol | 0.5 | 0.5 | 0.5 |
| T-12 | 0.0125 | 3.0* | 3.0* |
| 1,4 Butanediol | 4.3 | 4.3 | 4.3 |
| Thanol SF5500 | 8.3 | 8.3 | 8.3 |
| Properties ** | | | |
| Shore A | 79 | 84 | 82 |
| 10% Modulus, MPa | 1.2 | 1.5 | 1.4 |
| 100% Modulus, MPa | 3.9 | 3.6 | 3.9 |
| 300% Modulus, MPa | 5.2 | — | 5.4 |
| Tensile, MPa | 19.7 | 4.1 | 8.9 |
| Elongation, % | 1085 | 232.5 | 750 |
| Trouser tear, kN/m | 13.5 | 9.9 | 12.2 |
| DeMattia, pierced, cycles to 0.5" | 7500 | 8000 | 20,000–40,000 |

*0.1% by weight of T-12 solution in DOP
**Samples aged for one week at 50° C. after curing Experimental JR70-15 Dual 90 radial tires which contained a buffed-in groove around the sidewall region was coated with the following paint and tested. The groove measures about 2.85 cm (1⅛ inch) wide×0.16 cm (1/16 inch) deep. As mentioned earlier, half of the tire sidewall compound is staining and half is not.

| Materials | phr |
|---|---|
| Adiprene LW 510 | 100 |
| DC 203 | 0.2 |
| T-12 | 0.015 |
| A1163-69 (65% Titanox 2071 in DOP) | 6.85 |
| DOP | 3.2 |
| Ionol | 0.5 |
| 90:10 by weight (44:1 molar ratio) 1,4 Butanediol/Pluracol TP440 | 5.13 |

The formulation was derived from a series of designed experiments. It has a DeMattia flex life of about 27,500 cycles.

Tire No. 1

The tire's sidewall groove was first cleaned with MEK then dried in air. One-half of the groove was chlorinated, rinsed and further dried. The coating was applied with the aid of a Teflon blade. Curing of the tire was done in an oven for 30 minutes at 215° F. (102° C.), followed by two days of room temperature aging. The tire was then tested on a pulley wheel with the following applied conditions:

TABLE VII

Speed = 50 mph
Inflation Pressure = 24 psi

| Approximate Load on Tire | | % Rated Load | Time of Test (hrs.) | Cumulative Time (hrs.) |
|---|---|---|---|---|
| (lbs.) | (Kg) | | | |
| 1180 | 536 | 100 | 2 | 2 |
| 1320 | 600 | 119 | 4 | 6 |

TABLE VII-continued

| Approximate Load on Tire | | Speed = 50 mph Inflation Pressure = 24 psi | | |
|---|---|---|---|---|
| (lbs.) | (Kg) | % Rated Load | Time of Test (hrs.) | Cumulative Time (hrs.) |
| 1530 | 695 | 1130 | 10 | 16 |
| 1860 | 845 | 160 | 6.5 | 22.5 |

Pronounced discoloration was observed on the paint which was applied on the staining half of the sidewall prior to the test. At the end of the test, some of the paints were peeled off all over the tire. Very large size cracks in the paint were observed which extended from either edge of the groove to the near center. It is obvious that improvement in both fatigue life and adhesion of the coating was necessary.

Tire No. 2

The second tire was coated with the following formulation:

| Materials | phr |
|---|---|
| Adiprene LW 510 | 100 |
| A1163-96 (65% TITANOX ® 2015 in DOP) | 6.85 |
| Ionol | 0.5 |
| Dibutyltin dilaurate, T-12 | 0.0125 |
| 1,4 Butanediol | 4.3 |
| Thanol SF5503 | 8.3 |

About 40 grams of the paint were needed to fill the sidewall groove to about 1/32" (0.08 cm) thick using a brush. The coated tire was cured for 45 minutes at 225° F. (107.2° C.). It took about 15 minutes for the tire to reach the required temperature. The tire was then run on a pulley wheel at 100% rated load for two hours followed by another four hours at about 120% of rated load. The paint started to peel off after two hours of test. This might have been caused by the presence of masking tape placed around the two edges of the groove. The masking tape was used so that no coating was applied on the grooves' vertical edges. Cracking appeared to propagate from flaws generated at the outer groove edges, based on the results of the first tire test. The use of the masking tape did prevent cracks from occurring on the paint but the test was discontinued due to extensive adhesive failure.

The same tire was rebuffed and recoated with formulation C as described in Table VI. The coated tire was cured at the same conditions as before. After it had been aged for one week at room temperature, the tire was further postcured for one week at 122° F. (50° C.) before testing on the pulley wheel. No sign of peeling or cracking of the paint was observed after 2½ hours of test at 100% rated load (1180 lbs.) at 50 mph. Continued testing of the tire at 120% rated load (1320 lbs.) for five hours resulted in peeling of some portions of the paint, notably at the staining sidewall half. Only a few cracks were observed but these were rather large in size (up to 0.5" in length). The test was stopped overnight but resumed the following day at 120% rated load for four hours. Finally the load was increased to 130% of rated load (1530 lbs.) and the test continued for another three hours.

At the end of this period, practically all the paint around the staining sidewall half was peeled off while that on the nonstaining side still remained. A large number of discrete cracks extending radially toward the center from the outer edge were observed in the paint remaining around the nonstaining half of the sidewall. The debonding of the paint appeared to be both cohesive (in the coating phase) and adhesive. The staining sidewall section was covered with a noticeable layer of the white coating. The underside of the peeled coating and the remaining white film on the sidewall groove both assumed an orange peel look. This probably resulted from the entrapment of volatile material coming out of the tire during the application and curing of the paint. The discoloration of the paint on the staining sidewall section is an indication of the migration of foreign volatile matter from the tire. This probably caused a weakening of the interfacial bond strength and also deleteriously affected the flex and tear resistances of the applied coating.

The results gathered in this application suggest that a high molecular weight triol, preferably no less than 6000MW, be used with the 1,4 butanediol for chain extending and crosslinking the Adiprene LW510 based coating. Although the flex life of the best coating formulation described is approaching that of a rubber white sidewall compound, it is felt that improvement can still be achieved by reducing its modulus. Paint adhesion looks good but apparently not yet adequate. A staining rubber sidewall is not suitable for painting but it affects the integrity of the applied paint, causes interfacial debonding and discoloration.

I claim:

1. A pneumatic tire characterized in the sidewall is coated with:
    (a) a catalyzed reaction product of 100 parts of:
        (1) a prepolymer of a hydrogenated diphenylmethane diisocyanate-terminated polytetrahydrofuran containing from 2 to 6% by weight of isocyanate groups;
        (2) a chain extending diol having a 2 to 6 carbon atom chain; and
        (3) a chain extending and crosslinking triol having a molecular weight of from 130 to 11,000;
        wherein the ratio of NCO groups of (1) to the total OH groups of (2) and (3) has a value of from 100:80 to 100:97;
    (b) reinforced by the addition of from 4 to 10 parts of a titanium dioxide pigment.

* * * * *